US011260816B1

(12) United States Patent
Bodenhamer

(10) Patent No.: US 11,260,816 B1
(45) Date of Patent: Mar. 1, 2022

(54) PROXIMITY ALARM AND CHILD SEAT PRESSURE SENSOR

(71) Applicant: Robert Bodenhamer, Greensboro, NC (US)

(72) Inventor: Robert Bodenhamer, Greensboro, NC (US)

(*) Notice: Subject to any disclaimer, the term of this patent is extended or adjusted under 35 U.S.C. 154(b) by 0 days.

(21) Appl. No.: 17/008,730

(22) Filed: Sep. 1, 2020

(51) Int. Cl.
*G08B 21/00* (2006.01)
*B60R 21/015* (2006.01)
*B60N 2/00* (2006.01)
*G08B 21/02* (2006.01)
*G08B 21/22* (2006.01)
*B60N 2/28* (2006.01)

(52) U.S. Cl.
CPC ........ *B60R 21/01556* (2014.10); *B60N 2/002* (2013.01); *G08B 21/0269* (2013.01); *G08B 21/22* (2013.01); *B60N 2/28* (2013.01)

(58) Field of Classification Search
CPC .............. B60R 21/01556; G08B 21/22; G08B 21/0269; B60N 2/002; B60N 2/28
USPC ........................................................ 340/438
See application file for complete search history.

(56) References Cited

U.S. PATENT DOCUMENTS

| D313,528 S | 1/1991 | Perdelwitz, Jr. |
| 6,847,302 B2 | 1/2005 | Flanagan |
| 7,218,218 B1 | 5/2007 | Rogers |
| 7,567,181 B1 | 7/2009 | Davison |
| 8,063,788 B1 | 11/2011 | Morningstar |
| 10,276,016 B2 | 4/2019 | Mattarocci |
| 10,576,888 B1* | 3/2020 | Holman ................... B60Q 9/00 |
| 2006/0061201 A1* | 3/2006 | Skinner ............ B60R 21/01546 297/468 |
| 2014/0361889 A1 | 12/2014 | Wall, II |
| 2017/0001560 A1* | 1/2017 | Roisen ............... G08B 21/0288 |
| 2018/0065504 A1* | 3/2018 | Lan ..................... G08B 21/0283 |
| 2018/0096578 A1* | 4/2018 | Mattarocci ......... G08B 21/0277 |

FOREIGN PATENT DOCUMENTS

WO 03030118 4/2003

* cited by examiner

*Primary Examiner* — Mark S Rushing

(57) ABSTRACT

The proximity alarm and child seat pressure sensor is a safety device. The proximity alarm and child seat pressure sensor detects the presence of a child in a child safety seat. The child is in the custody of a custodian. The proximity alarm and child seat pressure sensor measures the span of the distance between the child safety seat and the custodian. If, while a child is detected in the child safety seat, the span of the distance between the child safety seat and the custodian is greater than a previously determined distance, the proximity alarm and child seat pressure sensor sends an alarm directly to the custodian. If the custodian fails to respond to the alarm within a previously determined amount of time, the proximity alarm and child seat pressure sensor sends an alarm informing the appropriate authority of the location of an unattended child.

18 Claims, 5 Drawing Sheets

PROXIMITY ALARM AND CHILD SEAT PRESSURE SENSOR

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of signaling and alarm systems including alarms for ensuring the safety of persons, more specifically, a child monitoring systems using a transmitter-receiver system. (G08B21/0288)

SUMMARY OF INVENTION

The proximity alarm and child seat pressure sensor is a safety device. The proximity alarm and child seat pressure sensor detects the presence of a child in a child safety seat. The child safety seat mounts in a vehicle. The child is in the custody of a custodian. The proximity alarm and child seat pressure sensor measures the span of the distance between the child safety seat and the custodian. If, while a child is detected in the child safety seat, the span of the distance between the child safety seat and the custodian is greater than a previously determined distance, the proximity alarm and child seat pressure sensor sends an alarm directly to the custodian. If the custodian fails to respond to the alarm within a previously determined amount of time, the proximity alarm and child seat pressure sensor sends an alarm informing the appropriate authority of the location of an unattended child.

The proximity alarm and child seat pressure sensor comprises a master structure and a fob circuit. The master structure forms a wireless communication link with the fob circuit. The fob circuit is carried by the custodian. The master structure provides the child safety seat and detects when the child safety seat is occupied. The master structure determines the span of the distance between the child safety seat and the fob circuit. The proximity alarm and child seat pressure sensor generates alarms to the fob circuit and the appropriate authority.

These together with additional objects, features and advantages of the proximity alarm and child seat pressure sensor will be readily apparent to those of ordinary skill in the art upon reading the following detailed description of the presently preferred, but nonetheless illustrative, embodiments when taken in conjunction with the accompanying drawings.

In this respect, before explaining the current embodiments of the proximity alarm and child seat pressure sensor in detail, it is to be understood that the proximity alarm and child seat pressure sensor is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the proximity alarm and child seat pressure sensor.

It is therefore important that the claims be regarded as including such equivalent construction insofar as they do not depart from the spirit and scope of the proximity alarm and child seat pressure sensor. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
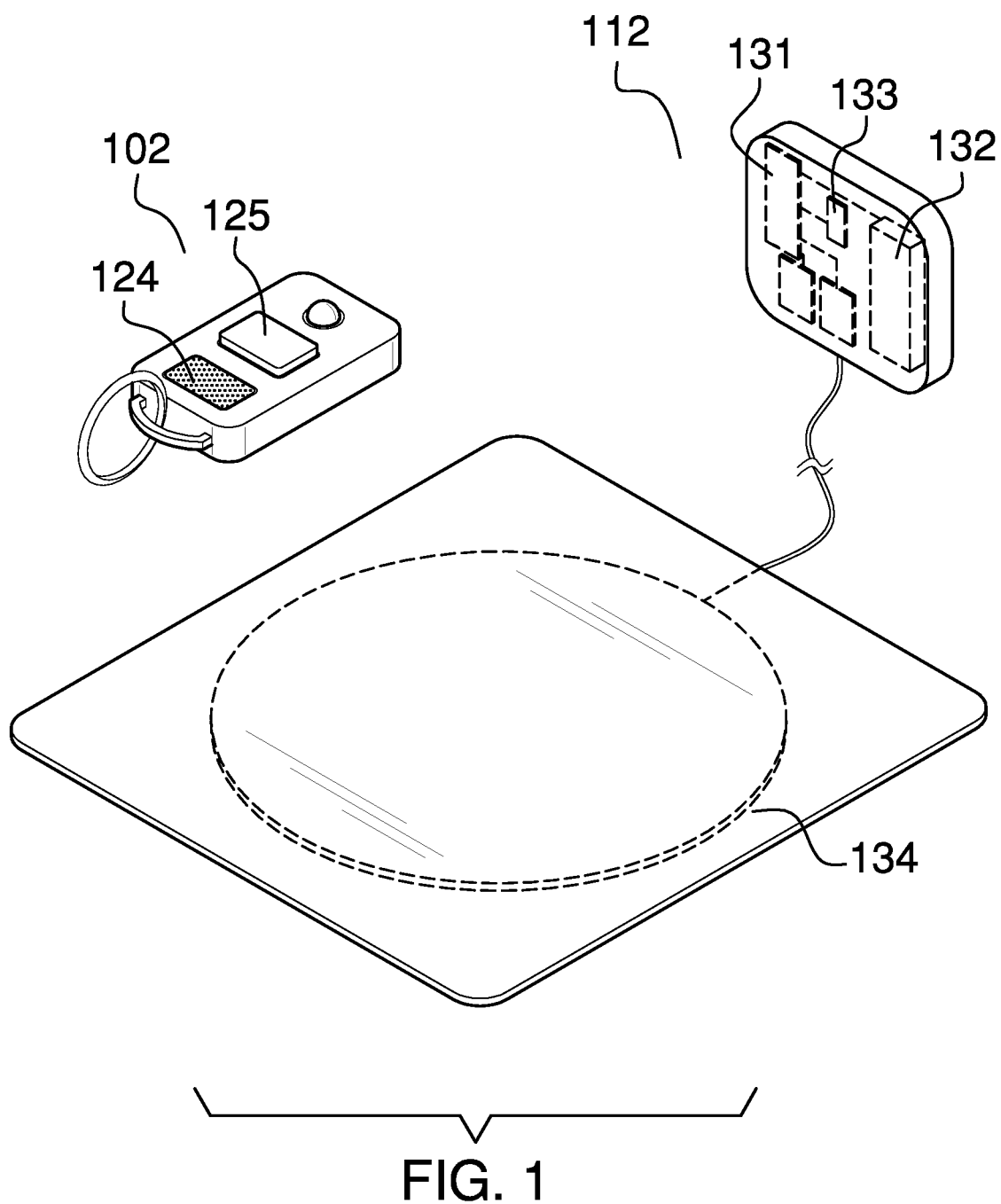
FIG. 1 is a perspective view of an embodiment of the disclosure.
Figure 2:
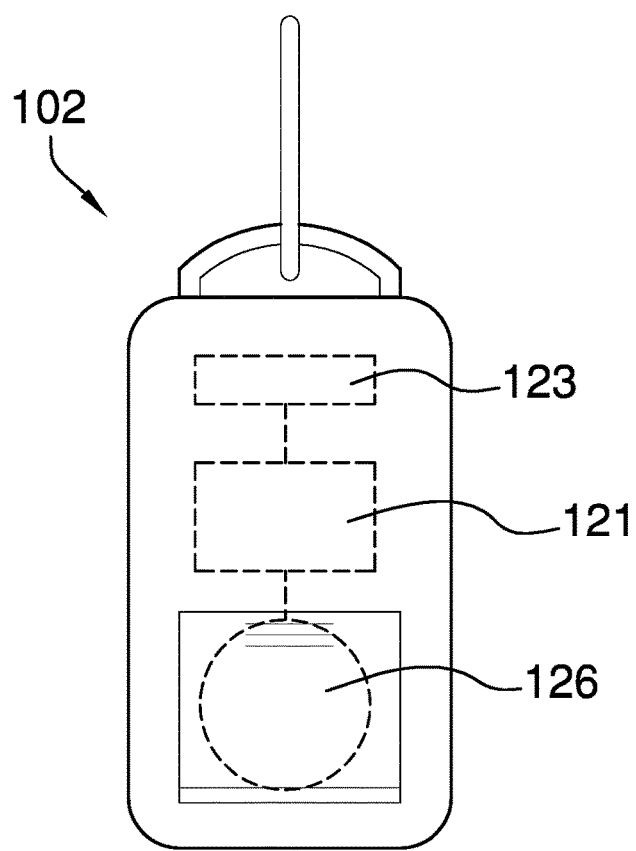
FIG. 2 is a rear view of an embodiment of the disclosure.
Figure 3:
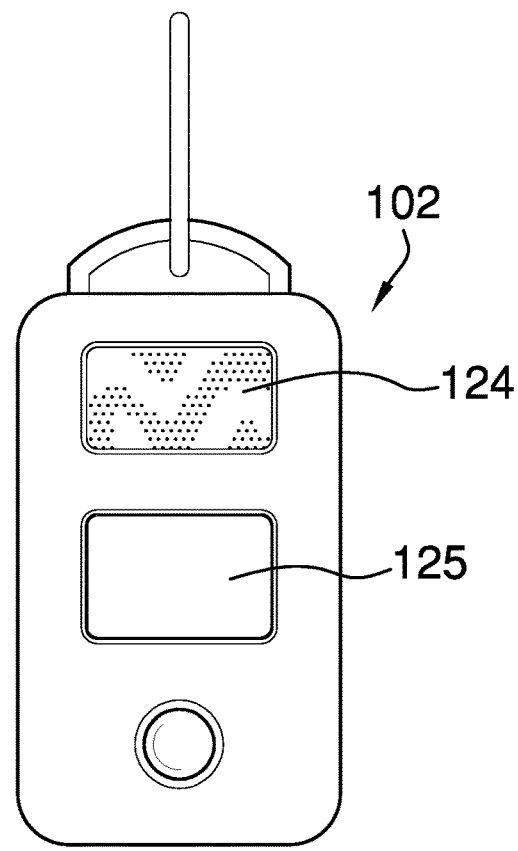
FIG. 3 is a front view of an embodiment of the disclosure.
Figure 4:
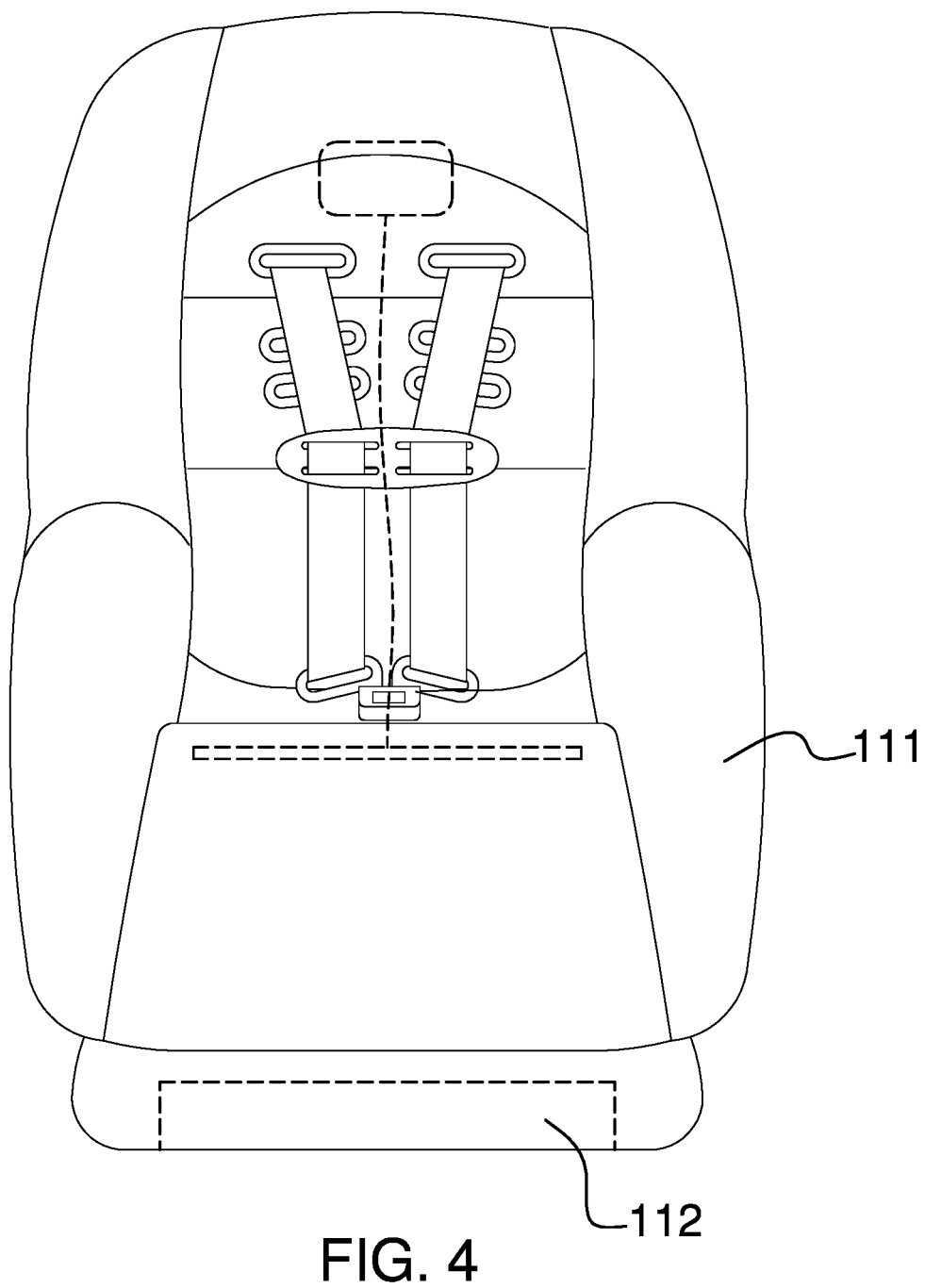
FIG. 4 is a front view of an embodiment of the disclosure.
Figure 5:
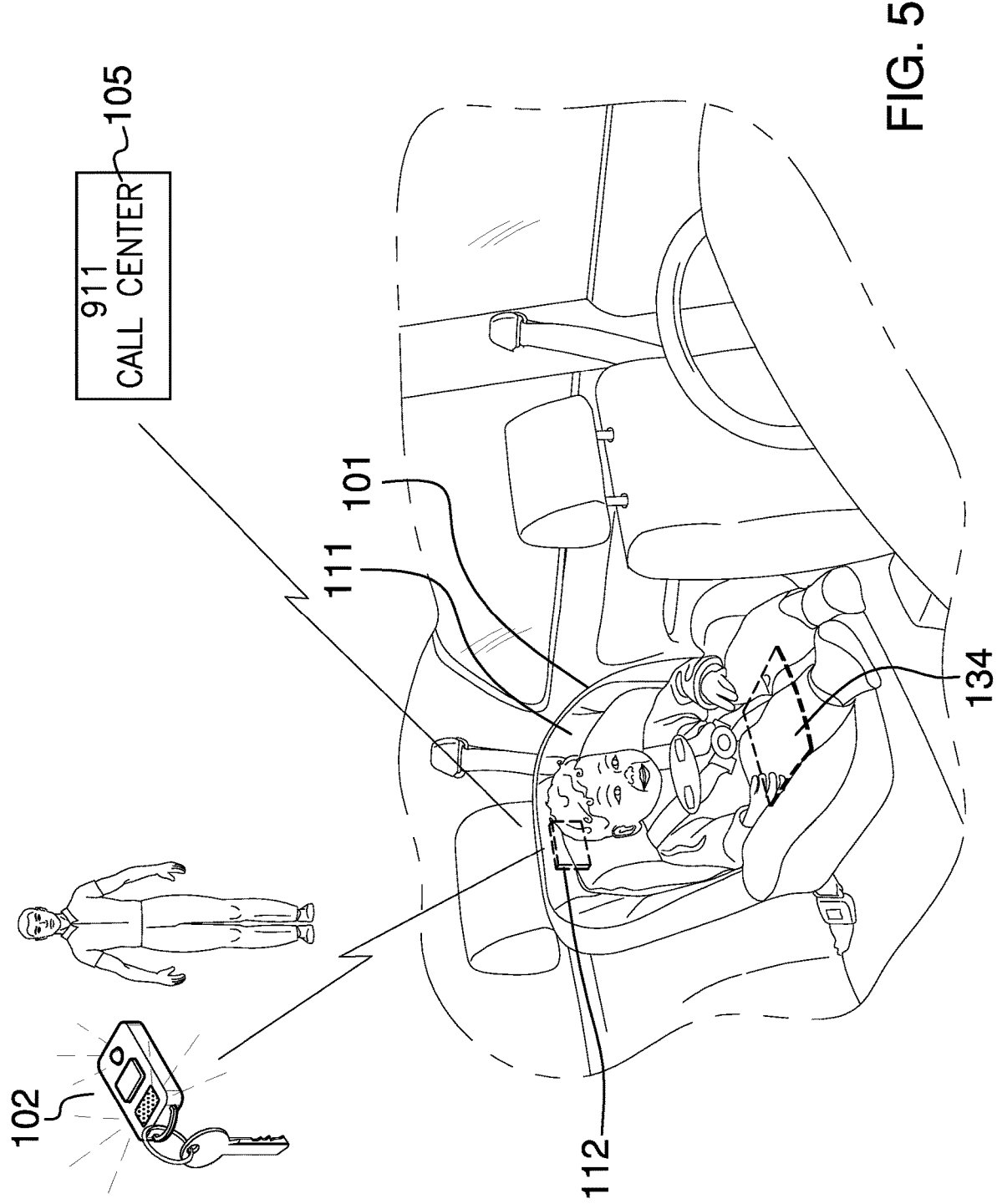
FIG. 5 is an in-use view of an embodiment of the disclosure.
Figure 6:
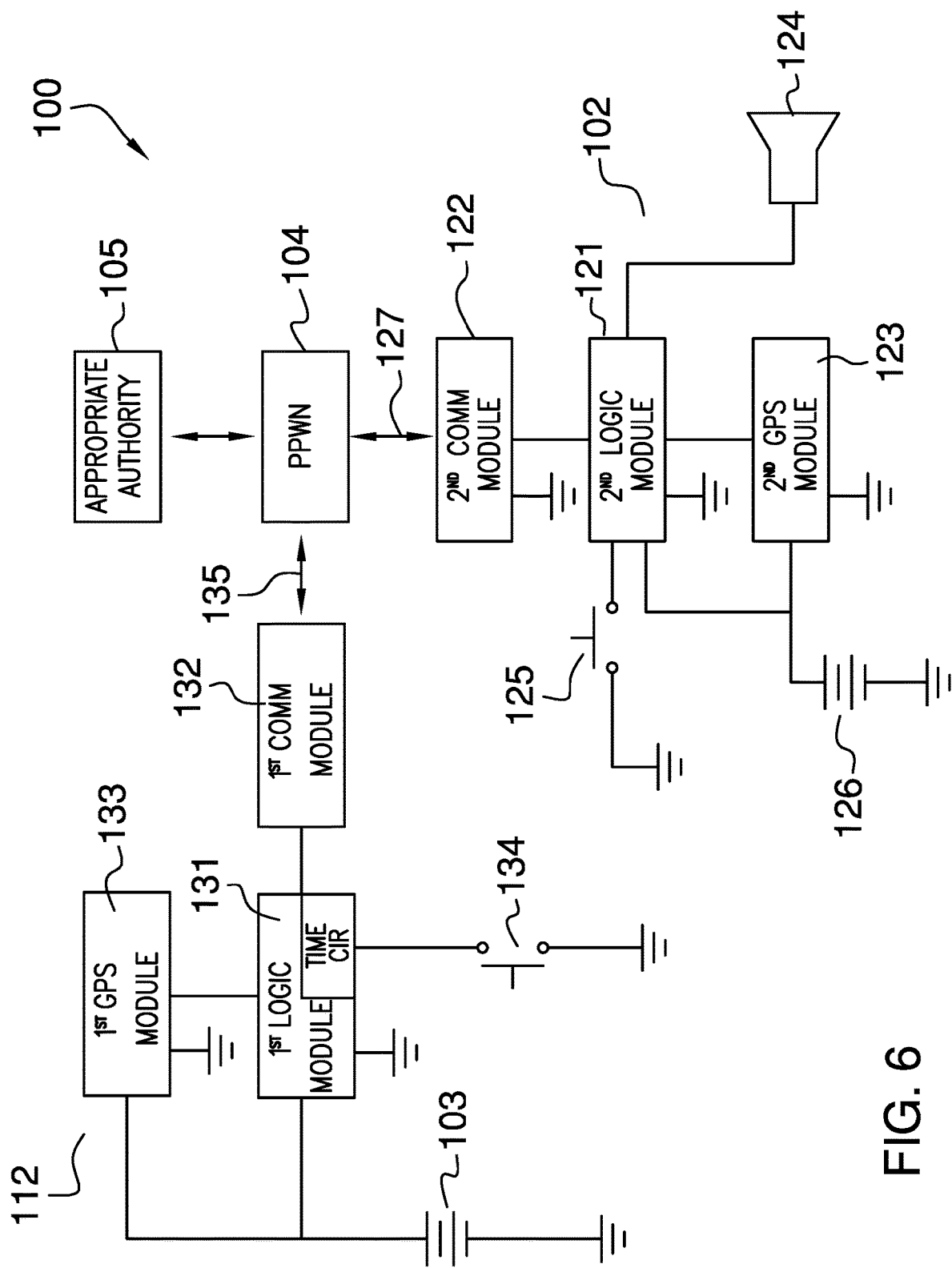
FIG. 6 is a schematic view of an embodiment of the disclosure.

Detailed reference will now be made to one or more potential embodiments of the disclosure, which are illustrated in FIGS. 1 through 6.

The proximity alarm and child seat pressure sensor 100 (hereinafter invention) is a safety device. The invention 100 detects the presence of a child in a child safety seat 111. The child is in the custody of a custodian. The invention 100 measures the span of the distance between the child safety seat 111 and the custodian. If, while a child is detected in the child safety seat 111, the span of the distance between the child safety seat 111 and the custodian is greater than a previously determined distance, the invention 100 sends an alarm directly to the custodian. If the custodian fails to respond to the alarm within a previously determined amount of time, the invention 100 sends an alarm informing the appropriate authority 105 of the location of an unattended child.

The invention 100 comprises a master structure 101 and a fob circuit 102. The master structure 101 forms a wireless communication link with the fob circuit 102. The fob circuit 102 is carried by the custodian of the passenger. The master structure 101 forms the child safety seat 111. The master structure 101 detects when the child safety seat 111 is occupied. The master structure 101 determines the span of the distance between the child safety seat 111 and the fob circuit 102. The invention 100 generates alarms to the fob circuit 102 and an appropriate authority 105.

The VECU 103 is the electrical system of the vehicle that the master structure 101 mounts in. The operation of the master structure 101 draws electrical energy from the VECU 103. The VECU 103 is defined elsewhere in this disclosure. The commercially provided and publicly available cellular wireless network 104 is defined elsewhere in this disclosure. The appropriate authority 105 is defined elsewhere in this disclosure.

The master structure 101 is the structure of the invention 100 that installs in the vehicle. The master structure 101 forms a seat that receives a passenger traveling in the vehicle.

The master structure 101 detects the presence of the passenger in the vehicle. The detection of a passenger in the master structure 101 initiates the master structure 101 to determine the GPS coordinates of the master structure 101. After determining the GPS coordinates of the master structure 101, the master structure 101 sends a location message to the fob circuit 102 requesting the GPS coordinates of the fob circuit 102. If after a previously determined amount of time, the master structure 101 has not received the GPS coordinates of the fob circuit 102, the master structure 101 transmits an alarm message to an appropriate authority 105 containing both: a) a statement that a passenger has been unexplainably separated from the custodian; and, b) the GPS coordinates of the master structure 101.

If the master structure 101 receives the GPS coordinates of the fob circuit 102, the master structure 101 uses the GPS coordinates of the master structure 101 and the GPS coordinates of the fob circuit 102 to calculate and determine the span of the distance between the master structure 101 and the fob circuit 102. If the master structure 101 determines that the span of the distance between the master structure 101 and the fob circuit 102 is less than a previously determined span of distance, the master structure 101 enters into a cycle requesting the GPS coordinates of the fob circuit 102 and confirming that the span of the distance between the master structure 101 and the fob circuit 102 is less than the previously determined span of distance.

If the master structure 101 ever determines that the span of the distance between the master structure 101 and the fob circuit 102 is greater than a previously determined span of distance, the master structure 101 sends the alarm message to the fob circuit 102 indicating that the custodian has become separated from the passenger. If after the previously determined amount of time, the master structure 101 has not received GPS coordinates from the fob circuit 102 indicating that the span of the distance between the fob circuit 102 and the master structure 101 has not been reduced to a span of distance less than the previously determined span of distance, the master structure 101 transmits the alarm message to the appropriate authority 105 containing both: a) a statement that a passenger has been unexplainably separated from the custodian; and, b) the GPS coordinates of the master structure 101.

The master structure 101 comprises a child safety seat 111 and a control circuit 112.

The child safety seat 111 is a seat that is installed in the vehicle. The child safety seat 111 is defined elsewhere in this disclosure. The child safety seat 111 contains the control circuit 112.

The control circuit 112 is an electric circuit. The control circuit 112 draws the electrical energy necessary for operation from the VECU 103 of the vehicle. The control circuit 112 detects the presence of the passenger in the child safety seat 111.

The detection of a passenger in the child safety seat 111 initiates the control circuit 112 to determine the GPS coordinates of the control circuit 112. After determining the GPS coordinates of the control circuit 112, the control circuit 112 sends a location message to the fob circuit 102 requesting the GPS coordinates of the fob circuit 102.

If after a previously determined amount of time, the control circuit 112 has not received the GPS coordinates of the fob circuit 102, the control circuit 112 transmits an alarm message to the appropriate authority 105 containing both: a) a statement that a passenger has been unexplainably separated from the custodian; and, b) the GPS coordinates of the control circuit 112. If the control circuit 112 receives the GPS coordinates of the fob circuit 102, the control circuit 112 uses the GPS coordinates of the control circuit 112 and the GPS coordinates of the fob circuit 102 to calculate and determine the span of the distance between the control circuit 112 and the fob circuit 102.

If the control circuit 112 determines that the span of the distance between the control circuit 112 and the fob circuit 102 is less than a previously determined span of distance, the control circuit 112 enters into a cycle requesting the GPS coordinates of the fob circuit 102 and confirming that the span of the distance between the control circuit 112 and the fob circuit 102 is less than the previously determined span of distance.

If the control circuit 112 ever determines that the span of the distance between the control circuit 112 and the fob circuit 102 is greater than a previously determined span of distance, the control circuit 112 sends the alarm message to the fob circuit 102 indicating that the custodian has become separated from the passenger. If after the previously determined amount of time, the control circuit 112 has not received GPS coordinates from the fob circuit 102 indicating that the span of the distance between the fob circuit 102 and the control circuit 112 has not been reduced to a span of distance less than the previously determined span of distance, the control circuit 112 transmits the alarm message to the appropriate authority 105 containing both: a) a statement that a passenger has been unexplainably separated from the custodian; and, b) the GPS coordinates of the control circuit 112.

The control circuit 112 comprises a first logic module 131, a first communication module 132, a first GPS module 133, and a weight sensor 134. The first communication module 132 further comprises a first wireless communication link 135. The first logic module 131, the first communication module 132, the first GPS module 133, and the weight sensor 134 are electrically interconnected. The first wireless communication link 135 allows the first communication module 132 to exchange one or more messages with the fob circuit 102 over the commercially provided and publicly available cellular wireless network 104.

The first logic module 131 is a readily and commercially available programmable electronic device that is used to manage, regulate, and operate the control circuit 112. Depending on the specific design and the selected components, the first logic module 131 can be a separate component within the control circuit 112 or the functions of the first logic module 131 can be incorporated into another component within the control circuit 112.

The first communication module 132 is a wireless electronic communication device that allows the first logic module 131 to wirelessly communicate with the fob circuit 102 and an appropriate authority 105 through a commercially provided and publicly available cellular wireless network 104. The first communication module 132 forms a first wireless communication link 135 with the commercially provided and publicly available cellular wireless network 104 to communicate SMS and MMS messages to the fob circuit 102 and to the appropriate authority 105. The use of a commercially provided and publicly available cellular wireless network 104 is preferred because: a) of its low cost; b) of the widespread availability and the broad interoperability between competing commercially provided and publicly available cellular wireless networks 104; and, c) methods and techniques to send SMS and MMS messages over a commercially provided and publicly available cellular wireless network 104 are well known and documented by those skilled in the electrical arts.

The first GPS module 133 is an electrical device that communicates with the GPS to determine the GPS coordinates of the first GPS module 133. When queried by the first logic module 131, the first GPS module 133 transfers the GPS coordinates to the first logic module 131.

The first logic module 131 detects the presence of the passenger in the child safety seat 111. The detection of a passenger in the child safety seat 111 initiates the first logic module 131 to determine the GPS coordinates of the first GPS module 133. After determining the GPS coordinates of the first GPS module 133, the first logic module 131 sends a location message to the fob circuit 102 requesting the GPS coordinates of the fob circuit 102.

If after a previously determined amount of time, the first logic module 131 has not received the GPS coordinates of the fob circuit 102, the first logic module 131 transmits an alarm message to the appropriate authority 105 containing both: a) a statement that a passenger has been unexplainably separated from the custodian; and, b) the GPS coordinates of the first logic module 131. If the first logic module 131 receives the GPS coordinates of the fob circuit 102, the first logic module 131 uses the GPS coordinates of the first GPS module 133 and the GPS coordinates of the fob circuit 102 to calculate and determine the span of the distance between the first GPS module 133 and the fob circuit 102.

If the first logic module 131 determines that the span of the distance between the first GPS module 133 and the fob circuit 102 is less than a previously determined span of distance, the first logic module 131 enters into a cycle requesting the GPS coordinates of the fob circuit 102 and confirming that the span of the distance between the first GPS module 133 and the fob circuit 102 is less than the previously determined span of distance. If the first logic module 131 ever determines that the span of the distance between the first GPS module 133 and the fob circuit 102 is greater than a previously determined span of distance, the first logic module 131 sends the alarm message to the fob circuit 102 indicating that the custodian has become separated from the passenger.

If after the previously determined amount of time, the first logic module 131 has not received GPS coordinates from the fob circuit 102 indicating that the span of the distance between the fob circuit 102 and the first GPS module 133 has not been reduced to a span of distance less than the previously determined span of distance, the first logic module 131 transmits the alarm message to the appropriate authority 105 containing both: a) a statement that a passenger has been unexplainably separated from the custodian; and, b) the GPS coordinates of the first logic module 131.

The first logic module 131 transmits the location message using the first communication module 132. The first logic module 131 transmits the alarm message using the first communication module 132.

The fob circuit 102 is an electric circuit. The fob circuit 102 is carried by the custodian of the passenger. The custodian is defined elsewhere in this disclosure. The fob circuit 102 receives the location message from the master structure 101 requesting the GPS coordinates of the fob circuit 102. In response to the location message, the fob circuit 102 transmits a responding message to the master structure 101 providing the requested GPS coordinates. The fob circuit 102 receives the alarm message from the master structure 101. In response to the alarm message, the fob circuit 102 generates an audible alarm and a tactile alarm indicating to the custodian that the span of the distance between the master structure 101 and the fob circuit 102 is greater than the previously determined span of distance and that the custodian should return to the passenger that remains in the master structure 101.

The fob circuit 102 comprises a second logic module 121, a second communication module 122, a second GPS module 123, a buzzer 124, an acknowledgment switch 125, and a battery 126. The second communication module 122 further comprises a second wireless communication link 127. The second logic module 121, the second communication module 122, the second GPS module 123, the buzzer 124, the acknowledgment switch 125, and the battery 126 are electrically interconnected. The second wireless communication link 127 allows the second communication module 122 to exchange one or more messages with the control circuit 112 of the master structure 101 over the commercially provided and publicly available cellular wireless network 104.

The second logic module 121 is a readily and commercially available programmable electronic device that is used to manage, regulate, and operate the fob circuit 102. Depending on the specific design and the selected components, the second logic module 121 can be a separate component within the control circuit 112 or the functions of the second logic module 121 can be incorporated into another component within the control circuit 112.

The second communication module 122 is a wireless electronic communication device that allows the second logic module 121 to wirelessly communicate with the control circuit 112 through a commercially provided and publicly available cellular wireless network 104. The second communication module 122 forms a second wireless communication link 127 with the commercially provided and publicly available cellular wireless network 104 to communicate SMS and MMS messages to the fob circuit 102. The use of a commercially provided and publicly available cellular wireless network 104 is preferred because: a) of its low cost; b) of the widespread availability and the broad interoperability between competing commercially provided and publicly available cellular wireless networks 104; and, c) methods and techniques to send SMS and MMS messages over a commercially provided and publicly available cellular wireless network 104 are well known and documented by those skilled in the electrical arts.

The second GPS module 123 is an electrical device that communicates with the GPS to determine the GPS coordinates of the second GPS module 123. When queried by the second logic module 121, the second GPS module 123 transfers the GPS coordinates to the second logic module 121.

The second logic module 121 receives the location message from the master structure 101 requesting the GPS coordinates of the fob circuit 102. The second logic module 121 receives the location message through the second communication module 122. In response to the location message, the second logic module 121 transmits a responding message to the master structure 101 providing the requested GPS coordinates of the second GPS module 123 using the second communication module 122. The second logic module 121 receives the alarm message from the master structure 101. In response to the alarm message, the second logic module 121 actuates the buzzer 124 which generates the audible alarm and the tactile alarm indicating to the custodian that the span of the distance between the master structure 101 and the second logic module 121 is greater than the previously determined span of distance.

The buzzer 124 is an electrical device. The buzzer 124 is a vibration motor. The second logic module 121 controls the operation of the buzzer 124. When the second logic module 121 receives an alarm message from the control circuit 112, the second logic module 121 generates a voltage that powers the operation of the buzzer 124. The rotation of the vibration motor that forms the buzzer 124 generates an audible sound that forms the audible alarm generated by the fob circuit 102. The rotation of the vibration motor that forms the buzzer 124 further generates a mechanical vibration that forms the tactile alarm generated by the fob circuit 102.

The acknowledgment switch 125 is an electric switch. The acknowledgment switch 125 is a momentary switch. The second logic module 121 monitors the acknowledgment switch 125. The second logic module 121 discontinues the operation of the buzzer 124 once the custodian has acknowledged the situation by actuating the acknowledgment switch 125.

The battery 126 is an electrochemical device. The battery 126 is a replaceable device. The battery 126 converts chemical potential energy into electrical energy used to power the operation of the fob circuit 102. The battery 126 is defined elsewhere in this disclosure.

The weight sensor 134 is a sensor used to detect the presence of a passenger in the child safety seat 111. The weight sensor 134 mounts in the child safety seat 111. The first logic module 131 monitors the weight sensor 134. The weight sensor 134 detects the passenger by detecting the weight of the passenger in the child safety seat 111. The detection of a passenger in the child safety seat 111 by the weight sensor 134 signals the first logic module 131 to initiate the operation of the control circuit 112. The weight sensor 134 is a force sensor selected from the group consisting of a pressure plate switch and a piezoelectric device. In the first potential embodiment of the disclosure, the applicant anticipates that the weight sensor 134 is a pressure plate switch.

The following definitions were used in this disclosure:

Appropriate Authority: As used in this disclosure, an appropriate authority is a previously determined person or organization that is designated to send and receive alarm or other notification messages regarding a monitored system or activity.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Buzzer: As used in this disclosure, a buzzer is two lead electrical device that generates an audible sound and a tactile vibration when voltage is applied to the two leads. The buzzer is typically formed from a vibration motor.

Child Safety Seat: As used in this disclosure, a child safety seat is a safety device configured for use with an automobile. The child safety seat is a restraining device that protects a child from injury should an unfortunate event occur to the automobile. A booster seat refers to a child safety seat that is formed without a backrest. The booster seat acts as an intermediate safety device for a child that is too large to use a child safety seat but too small to safely use the seat belt system of a vehicle.

Commercially Provided And Publicly Available Cellular Wireless Network: As used in this disclosure, a commercially provided and publicly available cellular wireless network refers to subscription based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN. See subscription.

Communication Link: As used in this disclosure, a communication link refers to the structured exchange of data between two objects.

Custody: As used in this disclosure, custody refers to an object or person that is under the physical control or care of a custodian. The custodian is an appropriate authority responsible for the proper operation, appropriate use, or well-being of the object or person that is in custody.

Domestic Article: As used in this disclosure, a domestic article is an item or object: 1) that is commonly found within a household; or, 2) that is commonly carried or worn by a person. Examples of domestic articles include, but are not limited to, clothing, keys and key fobs, personal data devices, glasses, remote controls, or personal storage items such as purses, briefcases, wallets, or cases.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Fob: As used in this disclosure, a fob is a container that: a) contains an electric circuit; and, b) is carried by a person as a domestic article.

Force: As used in this disclosure, a force refers to a net (or unopposed) measurable interaction that changes the direction of motion of an object, the velocity of motion of an object, the momentum of an object, or the stress within an object.

Force Sensor: As used in this disclosure, the force sensor is a sensor that generates an electrically measurable signal that is a function of the amount of force applied to the force sensor. The force sensor is often referred to as a pressure sensor. The force sensor commonly measures force using the piezoelectric effect generated by the deformation of a material.

GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Load Cell: As used in this disclosure, a load cell is a transducer that measures an applied force and generates an electrical signal that is a known function of the applied force. A load cell is often used to measure weights.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to the quantification of a mass that is exposed to the force of gravity.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Motor: As used in this disclosure, a motor refers to the method of transferring energy from an external power source into rotational mechanical energy.

Oscillation: As used in this disclosure, oscillation refers to a rhythmic variation of a measured physical parameter around a center value or a center position. The infinitive form of oscillation is to oscillate. An oscillation is often informally referred to as a vibration.

Piezoelectric Effect: As used in this disclosure, the piezoelectric effect refers to a class of materials wherein a strain placed upon the material will result in a redistribution of electrons within the material in a manner that causes an electric charge. This electric charge can be measured as a voltage potential across the material. This effect can be reversed in some of these materials such that the application of an AC voltage to the material will cause a vibration within the material. A material commonly used to take advantage of the piezoelectric effect is polyvinylidene difluoride (CAS 24937-79-9) which is also known as PVDF.

PPWN: As used in this disclosure, the PPWN is an acronym for publically provided wireless network. The PPWN refers to a commercially provided and publicly available cellular wireless network.

Pressure Plate Switch: As used in this disclosure, pressure plate switch is a commercially available switching device wherein a momentary switch is placed underneath a flexible or semi-rigid surface such that when pressure is applied to or removed from the flexible or semi-rigid surface the underlying switch is actuated. An example of a commercially marketed pressure switch is commonly marketed as a bed alarm with a sensor pad for dementia patients. The sensor pad is commonly a pressure switch.

Pressure Switch: As used in this disclosure, a pressure switch is an electrical switch that actuated by an applied pressure. Pressure switches are commercially available.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transceiver: As used in this disclosure, a transceiver is a device that is used to generate, transmit, and receive electromagnetic radiation such as radio signals.

Transducer: As used in this disclosure, a transducer is a device that converts a physical quantity, such as pressure or brightness into an electrical signal or a device that converts an electrical signal into a physical quantity.

Unfortunate Event: As used in this disclosure, an unfortunate event is an incident that: 1) happens unexpectedly; 2) happens unintentionally; and, 3) has the potential to cause injury and or property damage.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Vibration: As used in this disclosure, vibration refers to one or more oscillations that are generated by a system that is not in equilibrium.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the electric current flowing through the vibration motor.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A proximity alarm and child seat pressure sensor comprising a master structure and a fob circuit;
    wherein the master structure forms a wireless communication link with the fob circuit;
    wherein the proximity alarm and child seat pressure sensor is a safety device;
    wherein the proximity alarm and child seat pressure sensor detects the presence of a passenger in a child safety seat;
    wherein the passenger is in the custody of a custodian;
    wherein the fob circuit is carried by the custodian of the passenger;
    wherein the proximity alarm and child seat pressure sensor measures the span of the distance between the child safety seat and the custodian;
    wherein if the span of the distance between the child safety seat and the custodian is greater than a previously determined distance, the proximity alarm and child seat pressure sensor sends an alarm directly to the custodian;
    wherein if the custodian fails to respond to the alarm within a previously determined amount of time, the proximity alarm and child seat pressure sensor sends an alarm informing an appropriate authority of the location of an unattended child;
    wherein the master structure forms the child safety seat;
    wherein the master structure detects when the child safety seat is occupied;
    wherein the master structure determines the span of the distance between the child safety seat and the fob circuit;
    wherein the master structure comprises a child safety seat and a control circuit;
    wherein the child safety seat is a seat that is installed in a vehicle;
    wherein the child safety seat contains the control circuit;
    wherein the master structure is the structure of the proximity alarm and child seat pressure sensor that installs in the vehicle;
    wherein the master structure forms a seat that receives a passenger traveling in the vehicle;
    wherein the master structure detects the presence of the passenger in the vehicle;
    wherein the detection of a passenger in the master structure initiates the master structure to determine the GPS coordinates of the master structure;
    wherein after determining the GPS coordinates of the master structure, the master structure sends a location message to the fob circuit requesting the GPS coordinates of the fob circuit;
    wherein if after a previously determined amount of time, the master structure has not received the GPS coordinates of the fob circuit, the master structure transmits an alarm message to the appropriate authority containing both: a) a statement that a passenger has been unexplainably separated from the custodian; and, b) the GPS coordinates of the master structure;
    wherein if the master structure receives the GPS coordinates of the fob circuit, the master structure uses the GPS coordinates of the master structure and the GPS coordinates of the fob circuit to calculate and determine the span of the distance between the master structure and the fob circuit;
    wherein if the master structure determines that the span of the distance between the master structure and the fob circuit is less than a previously determined span of distance, the master structure enters into a cycle requesting the GPS coordinates of the fob circuit and confirming that the span of the distance between the master structure and the fob circuit is less than the previously determined span of distance;
    wherein if the master structure ever determines that the span of the distance between the master structure and the fob circuit is greater than a previously determined span of distance, the master structure sends the alarm message to the fob circuit indicating that the custodian has become separated from the passenger;
    wherein if after the previously determined amount of time, the master structure has not received GPS coordinates from the fob circuit indicating that the span of the distance between the fob circuit and the master structure has not been reduced to a span of distance less than the previously determined span of distance, the master structure transmits the alarm message to the appropriate authority containing both: a) a statement that a passenger has been unexplainably separated from the custodian; and, b) the GPS coordinates of the master structure.

2. The proximity alarm and child seat pressure sensor according to claim 1
    wherein the control circuit is an electric circuit;
    wherein the control circuit draws the electrical energy necessary for operation from the VECU of the vehicle;
    wherein the control circuit detects the presence of the passenger in the child safety seat;

wherein the detection of a passenger in the child safety seat initiates the control circuit to determine the GPS coordinates of the control circuit;

wherein after determining the GPS coordinates of the control circuit, the control circuit sends a location message to the fob circuit requesting the GPS coordinates of the fob circuit;

wherein if after a previously determined amount of time, the control circuit has not received the GPS coordinates of the fob circuit, the control circuit transmits an alarm message to the appropriate authority containing both: a) a statement that a passenger has been unexplainably separated from the custodian; and, b) the GPS coordinates of the control circuit;

wherein if the control circuit receives the GPS coordinates of the fob circuit, the control circuit uses the GPS coordinates of the control circuit and the GPS coordinates of the fob circuit to calculate and determine the span of the distance between the control circuit and the fob circuit;

wherein if the control circuit determines that the span of the distance between the control circuit and the fob circuit is less than a previously determined span of distance, the control circuit enters into a cycle requesting the GPS coordinates of the fob circuit and confirming that the span of the distance between the control circuit and the fob circuit is less than the previously determined span of distance;

wherein if the control circuit ever determines that the span of the distance between the control circuit and the fob circuit is greater than a previously determined span of distance, the control circuit sends the alarm message to the fob circuit indicating that the custodian has become separated from the passenger;

wherein if after the previously determined amount of time, the control circuit has not received GPS coordinates from the fob circuit indicating that the span of the distance between the fob circuit and the control circuit has not been reduced to a span of distance less than the previously determined span of distance, the control circuit transmits the alarm message to the appropriate authority containing both: a) a statement that a passenger has been unexplainably separated from the custodian; and, b) the GPS coordinates of the control circuit.

3. The proximity alarm and child seat pressure sensor according to claim 2
wherein the fob circuit is an electric circuit;
wherein the fob circuit receives the location message from the master structure requesting the GPS coordinates of the fob circuit;
wherein in response to the location message, the fob circuit transmits a responding message to the master structure providing the requested GPS coordinates;
wherein the fob circuit receives the alarm message from the master structure;
wherein in response to the alarm message, the fob circuit generates an audible alarm and a tactile alarm indicating to the custodian that the span of the distance between the master structure and the fob circuit is greater than the previously determined span of distance and that the custodian should return to the passenger that remains in the master structure.

4. The proximity alarm and child seat pressure sensor according to claim 3
wherein the control circuit comprises a first logic module, a first communication module, a first GPS module, and a weight sensor;
wherein the first communication module further comprises a first wireless communication link;
wherein the first logic module, the first communication module, the first GPS module, and the weight sensor are electrically interconnected;
wherein the first wireless communication link allows the first communication module to exchange one or more messages with the fob circuit over a commercially provided and publicly available cellular wireless network;
wherein the first wireless communication link allows the first communication module to exchange one or more messages with the appropriate authority over the commercially provided and publicly available cellular wireless network.

5. The proximity alarm and child seat pressure sensor according to claim 4
wherein the fob circuit comprises a second logic module, a second communication module, a second GPS module, a buzzer, an acknowledgment switch, and a battery;
wherein the second communication module further comprises a second wireless communication link;
wherein the second logic module, the second communication module, the second GPS module, the buzzer, the acknowledgment switch, and the battery are electrically interconnected;
wherein the second wireless communication link allows the second communication module to exchange one or more messages with the control circuit of the master structure over the commercially provided and publicly available cellular wireless network.

6. The proximity alarm and child seat pressure sensor according to claim 5
wherein the first logic module transmits the location message using the first communication module;
wherein the first logic module transmits the alarm message using the first communication module;
wherein the first communication module is a wireless electronic communication device that allows the first logic module to wirelessly communicate with the fob circuit and an appropriate authority through a commercially provided and publicly available cellular wireless network;
wherein the first communication module forms a first wireless communication link with the commercially provided and publicly available cellular wireless network to communicate SMS and MMS messages to the control circuit and to the appropriate authority.

7. The proximity alarm and child seat pressure sensor according to claim 6
wherein the first GPS module is an electrical device that communicates with the GPS to determine the GPS coordinates of the first GPS module;
wherein when queried by the first logic module, the first GPS module transfers the GPS coordinates to the first logic module.

8. The proximity alarm and child seat pressure sensor according to claim 7
wherein the first logic module is a programmable electronic device;
wherein the first logic module detects the presence of the passenger in the child safety seat;
wherein the detection of a passenger in the child safety seat initiates the first logic module to determine the GPS coordinates of the first GPS module;

wherein after determining the GPS coordinates of the first GPS module, the first logic module sends a location message to the fob circuit requesting the GPS coordinates of the fob circuit;

wherein if after a previously determined amount of time, the first logic module has not received the GPS coordinates of the fob circuit, the first logic module transmits an alarm message to the appropriate authority containing both: a) a statement that a passenger has been unexplainably separated from the custodian; and, b) the GPS coordinates of the first logic module;

wherein if the first logic module receives the GPS coordinates of the fob circuit, the first logic module uses the GPS coordinates of the first GPS module and the GPS coordinates of the fob circuit to calculate and determine the span of the distance between the first GPS module and the fob circuit;

wherein if the first logic module determines that the span of the distance between the first GPS module and the fob circuit is less than a previously determined span of distance, the first logic module enters into a cycle requesting the GPS coordinates of the fob circuit and confirming that the span of the distance between the first GPS module and the fob circuit is less than the previously determined span of distance;

wherein if the first logic module ever determines that the span of the distance between the first GPS module and the fob circuit is greater than a previously determined span of distance, the first logic module sends the alarm message to the fob circuit indicating that the custodian has become separated from the passenger;

wherein if after the previously determined amount of time, the first logic module has not received GPS coordinates from the fob circuit indicating that the span of the distance between the fob circuit and the first GPS module has not been reduced to a span of distance less than the previously determined span of distance, the first logic module transmits the alarm message to the appropriate authority containing both: a) a statement that a passenger has been unexplainably separated from the custodian; and, b) the GPS coordinates of the first logic module.

9. The proximity alarm and child seat pressure sensor according to claim 8 wherein the second communication module is a wireless electronic communication device that allows the second logic module to wirelessly communicate with the control circuit through a commercially provided and publicly available cellular wireless network;

wherein the second communication module forms a second wireless communication link with the commercially provided and publicly available cellular wireless network to communicate SMS and MMS messages to the fob circuit.

10. The proximity alarm and child seat pressure sensor according to claim 9 wherein the second GPS module is an electrical device that communicates with the GPS to determine the GPS coordinates of the second GPS module;

wherein when queried by the second logic module, the second GPS module transfers the GPS coordinates to the second logic module.

11. The proximity alarm and child seat pressure sensor according to claim 10 wherein the second logic module is a programmable electronic device;

wherein the second logic module receives the location message from the master structure requesting the GPS coordinates of the fob circuit;

wherein the second logic module receives the location message through the second communication module;

wherein in response to the location message, the second logic module transmits a responding message to the master structure providing the requested GPS coordinates of the second GPS module using the second communication module;

wherein the second logic module receives the alarm message from the master structure;

wherein in response to the alarm message, the second logic module actuates the buzzer which generates the audible alarm and the tactile alarm indicating to the custodian that the span of the distance between the master structure and the second logic module is greater than the previously determined span of distance.

12. The proximity alarm and child seat pressure sensor according to claim 11 wherein the buzzer is an electrical device;

wherein the buzzer is a vibration motor;

wherein the second logic module controls the operation of the buzzer;

wherein the second logic module generates a voltage that powers the operation of the buzzer;

wherein the acknowledgment switch is an electric switch;

wherein the acknowledgment switch is a momentary switch;

wherein the second logic module monitors the acknowledgment switch;

wherein the second logic module discontinues the operation of the buzzer once the custodian has acknowledged the situation by actuating the acknowledgment switch.

13. The proximity alarm and child seat pressure sensor according to claim 12 wherein the weight sensor is a sensor used to detect the presence of a passenger in the child safety seat;

wherein the weight sensor mounts in the child safety seat;

wherein the first logic module monitors the weight sensor;

wherein the weight sensor detects the passenger by detecting the weight of the passenger in the child safety seat;

wherein the detection of a passenger in the child safety seat by the weight sensor signals the first logic module to initiate the operation of the control circuit;

wherein the weight sensor is a force sensor selected from the group consisting of a pressure plate switch and a piezoelectric device.

14. The proximity alarm and child seat pressure sensor according to claim 13 wherein the weight sensor is a pressure plate switch.

15. The proximity alarm and child seat pressure sensor according to claim 5 wherein the first logic module is a programmable electronic device;

wherein the first logic module detects the presence of the passenger in the child safety seat;

wherein the first logic module transmits the location message using the first communication module;

wherein the first logic module transmits the alarm message using the first communication module;

wherein the first communication module is a wireless electronic communication device that allows the first logic module to wirelessly communicate with the fob circuit and an appropriate authority through a commercially provided and publicly available cellular wireless network;

wherein the first communication module forms a first wireless communication link with the commercially provided and publicly available cellular wireless network to communicate SMS and MMS messages to the fob circuit and to the appropriate authority;

wherein the first GPS module is an electrical device that communicates with the GPS to determine the GPS coordinates of the first GPS module;

wherein when queried by the first logic module, the first GPS module transfers the GPS coordinates to the first logic module.

16. The proximity alarm and child seat pressure sensor according to claim 15 wherein the second logic module is a programmable electronic device;

wherein the second communication module is a wireless electronic communication device that allows the second logic module to wirelessly communicate with the control circuit through a commercially provided and publicly available cellular wireless network;

wherein the second communication module forms a second wireless communication link with the commercially provided and publicly available cellular wireless network to communicate SMS and MMS messages to the fob circuit;

wherein the second GPS module is an electrical device that communicates with the GPS to determine the GPS coordinates of the second GPS module;

wherein when queried by the second logic module, the second GPS module transfers the GPS coordinates to the second logic module.

17. The proximity alarm and child seat pressure sensor according to claim 16 wherein the buzzer is an electrical device;

wherein the buzzer is a vibration motor;

wherein the second logic module controls the operation of the buzzer;

wherein the second logic module generates a voltage that powers the operation of the buzzer;

wherein the acknowledgment switch is an electric switch;

wherein the acknowledgment switch is a momentary switch;

wherein the second logic module monitors the acknowledgment switch;

wherein the second logic module discontinues the operation of the buzzer once the custodian has acknowledged the situation by actuating the acknowledgment switch;

wherein the weight sensor is a sensor used to detect the presence of a passenger in the child safety seat;

wherein the weight sensor mounts in the child safety seat;

wherein the first logic module monitors the weight sensor;

wherein the weight sensor detects the passenger by detecting the weight of the passenger in the child safety seat;

wherein the detection of a passenger in the child safety seat by the weight sensor signals the first logic module to initiate the operation of the control circuit;

wherein the weight sensor is a force sensor selected from the group consisting of a pressure plate switch and a piezoelectric device.

18. The proximity alarm and child seat pressure sensor according to claim 17 wherein the weight sensor is a pressure plate switch.

* * * * *